United States Patent Office 3,398,141
Patented Aug. 20, 1968

3,398,141
QUINOXALINE-DI-N-OXIDES
Makhluf J. Haddadin and Costas H. Issidorides, Beirut, Lebanon, assignors to Research Corporation, New York, N.Y., a corporation of New York
No Drawing. Filed Jan. 12, 1966, Ser. No. 520,061
7 Claims. (Cl. 260—239.5)

ABSTRACT OF THE DISCLOSURE

Quinoxaline-di-N-oxides are prepared by condensing an isobenzofuroxan with an enamine.

This invention relates to organic compounds which may be described as quinoxaline-di-N-oxides. In one specific aspect, it relates to a novel method for the preparation of such compounds.

Quinoxaline-di-N-oxides are useful in the control of various pathogenic microorganisms and as intermediates in the preparation of other closely related compounds having similar antipathogenic activity. Also as shown in U.S. Patents 2,891,062 and 2,921,937 of Ursprung et al., quinoxaline-di-N-oxides have heretofore been prepared by processes involving the direct oxidation of quinoxaline compounds. Such processes require the corresponding quinoxaline compound as the starting material for making a particular di-N-oxide. Moreover, oxidation reactions are somewhat non-selective and are usually characterized by low yields of the desired product together with one or more difficultly separable by-products.

It is therefore an object of the present invention to provide a new and improved method for the preparation of quinoxaline-di-N-oxides.

It is a further object of the invention to provide a method for the preparation of quinoxaline-di-N-oxides which does not involve the direct oxidation of a quinoxaline compound.

It is still another object of the present invention to provide a novel condensation reaction for the preparation of quinoxaline-di-N-oxides which does not utilize a quinoxaline compound as a reactant.

It is yet another object of the invention to provide a method for the preparation of quinoxaline-di-N-oxides relatively free from difficult to separate by-products.

In accordance with the present invention, we have discovered a general method for the preparation of quinoxaline-di-N-oxides which comprises reacting an isobenzofuroxan with an enamine. Isobenzofuroxan is also known as benzofuroxan or benzofurazan-N-oxide. The preparation of isobenzofuroxan and substituted isobenzofuroxans is described by Kaufman et al. in "Chemical Reviews," volume 59, page 429 et seq. (1959) and by Mallory et al. in "Organic Syntheses," collective volume IV, pages 74 and 75, John Wiley and Sons, New York (1963).

Enamines are compounds wherein an amino group is attached to a carbon atom of an olefinic carbon-to-carbon double bond. A detailed review of the preparation and reactions of enamines is given by Szmuszkovicz, "Advances in Organic Chemistry," volume 4, pages 1–113, Interscience Publishers, New York (1963). Such compounds are most conveniently prepared by the reaction of a ketone with a secondary amine. Ketones of the formula

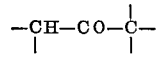

correspond to enamines of the formula

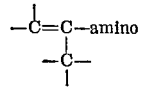

The remaining valences are satisfied by hydrogen and by hydrocarbyl groups such as alkyl, phenyl, phenalkyl, et cetera. Two alkyl substituents may be combined so as to form or complete a ring or other cyclic system and/or may have their chains interrupted by hetero atoms such as oxygen, nitrogen, sulfur and the like. The hydrocarbyl groups may also bear non-interfering substituents such as alkyl, halo, alkoxy, et cetera.

The preparative reaction of the present invention may be summarized as follows:

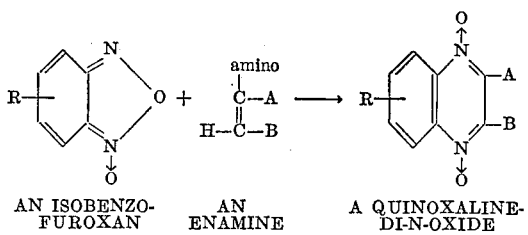

| AN ISOBENZO-FUROXAN | AN ENAMINE | A QUINOXALINE-DI-N-OXIDE |

In the above formulae, R represents hydrogen and other simple substituents usually found on benzene rings, i.e., alkyl, alkoxy, halo, nitro, et cetera. R may be any non-interfering annular substituent and more than one such substituent may be present. Thus, isobenzofuroxan or a substituted isobenzofuroxan may be employed in the process of the present invention.

A and B represent hydrogen and hydrocarbyl groups as hereinabove described. By the proper selection of A and B the process of the present invention may be used to prepare a wide variety of condensed polycyclic azine compounds. When A and B together form a ring or cyclic system, the resultant product will be at least a three condensed ring system. When A and B together do not form a ring, the product will be a relatively simple mono- or di-substituted quinoxaline-N,N'-dioxide.

For example, the enamines from cyclohexanone and morpholine or pyrrolidine give a three ring condensed quinoxaline-di-N-oxide of the structure—

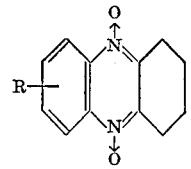

that of cyclopentanone and morpholine—

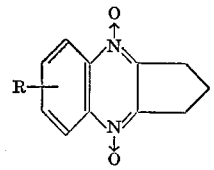

that of acetophenone and morpholine gives a simple substituted quinoxaline-di-N-oxide—

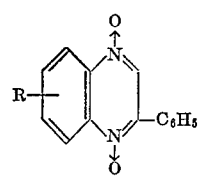

whereas that of a steroid ketone, such as 3-cholestanone, gives a rather complicated polycyclic quinoxaline-di-N-oxide—

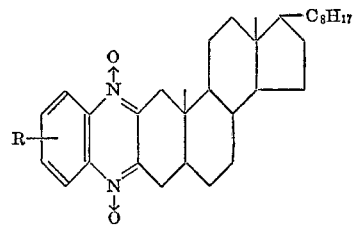

Reduction of these compounds with sodium dithionite gives the corresponding quinoxaline compounds; reduction with sodium borohydride gives the corresponding hydroquinoxaline compounds.

While the preferred enamines are alkyl amines such as di-lower-alkylamines and preferably secondary cyclic amines such as pyrrolidine and morpholine, the specific nature of the amine portion of the reactant enamine is not a part of the present invention. It should be emphasized that the process of the present invention is based on the discovery that the reaction of isobenzofuroxan with enamines constitutes a general method for the preparation of quinoxaline-di-N-oxides.

The reaction between isobenzofuroxan and the reactant enamine is effected preferably by adding the enamine to a warm solution of isobenzofuroxan in a solvent such as methanol, ethanol, dioxane, et cetera. The solid product is most conveniently isolated by evaporation of the solvent, and may be further purified by solvent recrystallization.

Chemical and physical evidence confirms the di-N-oxide structure of the product. For example, the infrared spectrum of 1,2,3,4 - tetrahydrophenazine - N,N' - dioxide obtained by the process of the present invention showed strong bonds at 1320 and 1300 reciprocal centimeters attributable to the N-oxide structure. Reduction of the compound with sodium dithionite gave 1,2,3,4-tetrahydrophenazine which could be oxidized back to the N,N'-dioxide. Reduction with sodium borohydride gave cis-1,2,3,4,4a,5,10,10a-octahydrophenazine.

Our invention is further illustrated by means of the following non-limiting examples:

EXAMPLE 1

1-morpholino-1-cyclohexene was added to a warm methanolic solution of isobenzofuroxan producing a deep red coloration and a rise in temperature of the reaction mixture. Concentration of the reaction mixture gave a 48% yield of 1,2,3,4-tetrahydrophenazine-N,N'-dioxide as a pale red solid melting 183–185° C. with decomposition. Recrystallization from methanol gave yellow prisms melting 185° C. with decomposition.

EXAMPLE 2

The same product was obtained when 1-pyrrolidino-1-cyclohexene was used in place of 1-morpholino-1-cyclohexene in Example 1.

EXAMPLE 3

Using the general method of Example 1, 1-morpholino-1-cyclopentene yielded 2,3-trimethylenequinoxaline-N,N'-dioxide melting at 182° C. with decomposition.

EXAMPLE 4

Using the general method of Example 1, 1-phenyl-1-(1-morpholino) - ethylene yielded 2 - phenylquinoxaline-N,N'-dioxide melting 210° C.

EXAMPLE 5

Using the general method of Example 1, 1-morpholino-2-cholestene yielded 2,3-cholestano-[b]quinoxaline-N,N'-dioxide melting 208° C.

It is apparent that variations may be made in the process of the present invention without departing from the spirit and the scope of the invention.

We claim:
1. A method for the preparation of quinoxaline-di-N-oxides which comprises reacting an isobenzofuroxan with an enamine.
2. A method for the preparation of quinoxaline-di-N-oxides which comprises reacting isobenzofuroxan with an enamine.
3. A method for the preparation of a 1,2,3,4-tetrahydrophenazine-N,N'-dioxide which comprises reacting an isobenzofuroxan with an enamine of cyclohexanone.
4. A method for the preparation of 1,2,3,4-tetrahydrophenazine-N,N'-dioxide which comprises reacting isobenzofuroxan with an enamine of cyclohexanone.
5. A method according to claim 4 wherein the cyclohexanone enamine is 1-morpholino-1-cyclohexene.
6. 2,3-cholestano-[b]quinoxaline-N,N'-dioxide.
7. 2,3-trimethylenequinoxaline-N,N'-dioxide.

References Cited

Doorenbos et al.: "Journal of Pharmaceutical Sciences," vol. 54, No. 8, August 1965, pp. 1219–1221.

ELBERT L. ROBERTS Primary Examiner.

Disclaimer 3,398,141.—*Makhluf J. Haddadin* and *Costas H. Issidorides*, Beirut, Lebanon. QUINOXALINE-DI-N-OXIDES. Patent dated Aug. 20, 1968. Disclaimer filed Jan. 27, 1969, by the assignee, *Research Corporation*.
Hereby enters this disclaimer to claim 7 of said patent.
[*Official Gazette March 11, 1969.*]